(12) United States Patent
Seo

(10) Patent No.: US 6,614,733 B2
(45) Date of Patent: Sep. 2, 2003

(54) APPARATUS AND METHOD OF DETERMINING DISK SIZE IN A MULTI-DISK CHANGER

(75) Inventor: Seong Hwan Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/022,509

(22) Filed: Dec. 20, 2001

(65) Prior Publication Data

US 2002/0075767 A1 Jun. 20, 2002

(30) Foreign Application Priority Data

Dec. 20, 2000 (KR) ........................................ 2000-79280

(51) Int. Cl.⁷ .............................................. G11B 17/08
(52) U.S. Cl. ................. 369/30.91; 369/30.93; 369/30.28
(58) Field of Search ....................... 369/30.91, 30.76, 369/30.79, 30.86, 30.93, 30.28, 187, 183, 77.1; 360/98, 99.02

(56) References Cited

U.S. PATENT DOCUMENTS 5,150,349 A * 9/1992 Takai et al. ................. 360/69
6,169,712 B1 * 1/2001 Yoshimura ............... 369/30.78
6,288,982 B1 * 9/2001 Kato ........................ 369/30.36

* cited by examiner

Primary Examiner—Carl Whitehead, Jr.
Assistant Examiner—Jennifer M Dolan
(74) Attorney, Agent, or Firm—Birch, Stewart, Kolasch & Birch, LLP

(57) ABSTRACT

The present invention relates to method and apparatus for determining presence or absence of a disk and size of a disk inserted in a disk holder of a multi-disk changer. A disk size determining apparatus of a multi-disk changer of the present invention, includes a turntable, a plurality of disk holders installed at same distance from the center of the turntable, each disk holder being able to hold a disk of different size selectively, and a single light-emitting element or a single photo-detecting element above or below the turntable, wherein said each disk holder has holes at same distance from the center of the turntable, each hole passing through a light-beam from the light-emitting element in order that the disk size can be determined. A manufacturing cost of a multi-disk changer can be reduced owing to usage of a single detecting sensor.

6 Claims, 6 Drawing Sheets

L : lenght of hole 81
L1 : partial length blocked by 8cm disk
v : linear velocity at hole 81 when the turntable rotates Conventional Art L : lenght of hole 81
L1 : partial length blocked by 8cm disk
v : linear velocity at hole 81 when the turntable rotates

APPARATUS AND METHOD OF DETERMINING DISK SIZE IN A MULTI-DISK CHANGER

BACKGROUND OF THE INVENTION

1. Field of the Invention

The present invention relates to apparatus and method for determining the presence or absence of a disk and the size of a disk loaded onto a disk holder of a multi-disk changer including a plurality of disk holders, each holder being able to selectively accommodate a disk of different size.

2. Description of the Related Art

FIG. 1 is a simplified plan-view of a conventional multi-disk changer, and FIGS. 2A and 2B are drawings for the purpose of describing in detail the operation of determining the size of a disk inserted in the multi-disk changer of FIG. 1.

The multi-disk changer 1 of FIG. 1 includes a plurality of disk holders 11 to 14, each being able to accommodate disks of different sizes, for example, a 12-cm compact disk (CD) and a 12-cm digital versatile disk (DVD), or an 8-cm compact disk. Two through-holes 21 and 22 to be used for determining disk size are formed in each disk holder.

As shown in FIG. 1, one of the two through-holes 21 and 22 is located inside 8-cm diameter of a disk holder and the other is between 8-cm and 12-cm diameter. And, the two through-holes 21 and 22 are also aligned along a line A–A' through the center of a disk turntable, as shown in FIG. 2A.

FIG. 2B is a cross-section taken along the line A–A' in FIG. 2A. As shown in FIG. 2B, a pair of a light-emitting element 30a (or 31a) and a photo-detecting element 30b (or 31b) are placed above and below each through-hole 21 (or 22) such that a light-beam from the light-emitting element 30a (or 31a) is transmitted to the photo-detecting element 30b (or 31b) through the corresponding through-hole 21 (or 22).

Each detecting sensor composed of the pair of light-emitting element 30a (or 31a) and photo-detecting element 30b (or 31b), is used to detect the size of the disk placed on the disk holder 11. For example, if an 8-cm disk has been placed on a 8-cm holding space 112 formed in the disk holder 11, a light-beam from the inner light-emitting element 30a is blocked by the presence of the disk so that the corresponding inner photo-detecting element 30b can not detect any light-beam. However, the outer photo-detecting element 31b can still detect a light-beam from the outer light-emitting element 31a because the outer through-hole 22 is not blocked by the disk. In this case, it can be determined that the placed disk is 8-cm.

If a 12-cm disk is placed on a 12-cm holding space 111 formed in the disk holder 11, the two light-beams from both light-emitting elements 30a and 31a are blocked by the 12-cm disk so that the two photo-detecting elements 30b and 31b can not detect any light-beam. The detection of no light-beam means that a 12-cm disk has been inserted.

When two light-beams from both light-emitting elements 30a and 31a are detected at both photo-detecting elements 30b and 31b, no disk has been inserted in the disk holder 11, so that the light-beam detection by two photo-detecting elements 30b and 31b means that there is no disk in the disk holder 11.

According to the above-described operations of the detecting sensors 30 and 31, both the presence or absence of a disk and disk size can be determined at a time, and a servo control such as spindle motor control for rotating a loaded disk can be optimized for the determined disk size.

However, the above-described disk size determining apparatus in a multi-disk changer uses two detecting sensors to determine both the presence or absence of a disk and the disk size, so that the manufacturing costs of a multi-disk changer is increased.

SUMMARY OF THE INVENTION

It is an object of the present invention to provide a method and apparatus of determining the presence or absence of a disk as well as the disk size using only one detecting sensor in a multi-disk changer including a plurality of disk holders, each being able to selectively accommodate a disk of different size.

A disk size determining apparatus of a multi-disk changer according to the present invention, includes a turntable, a plurality of disk holders installed at the same distance from the center of the turntable, each disk holder being able to selectively accommodate a disk of different size, and a light-emitting element or a photo-detecting element above or below the turntable, wherein each of said disk holders has holes at the same distance from the center of the turntable, with a light beam passing through each hole from the light-emitting element in order that the disk size can be determined.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENTS

In order that the invention may be fully understood, a preferred embodiment thereof will now be described with reference to the accompanying drawings.

Figure 2A:
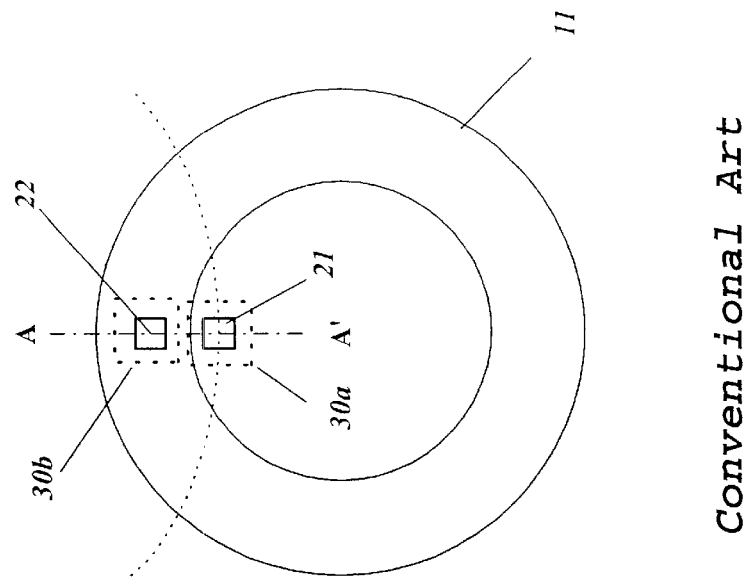
FIGS. 2A and 2B are drawings for explaining in detail the operation of determining the size of a disk loaded into the conventional multi-disk changer of FIG. 1.
Figure 1:
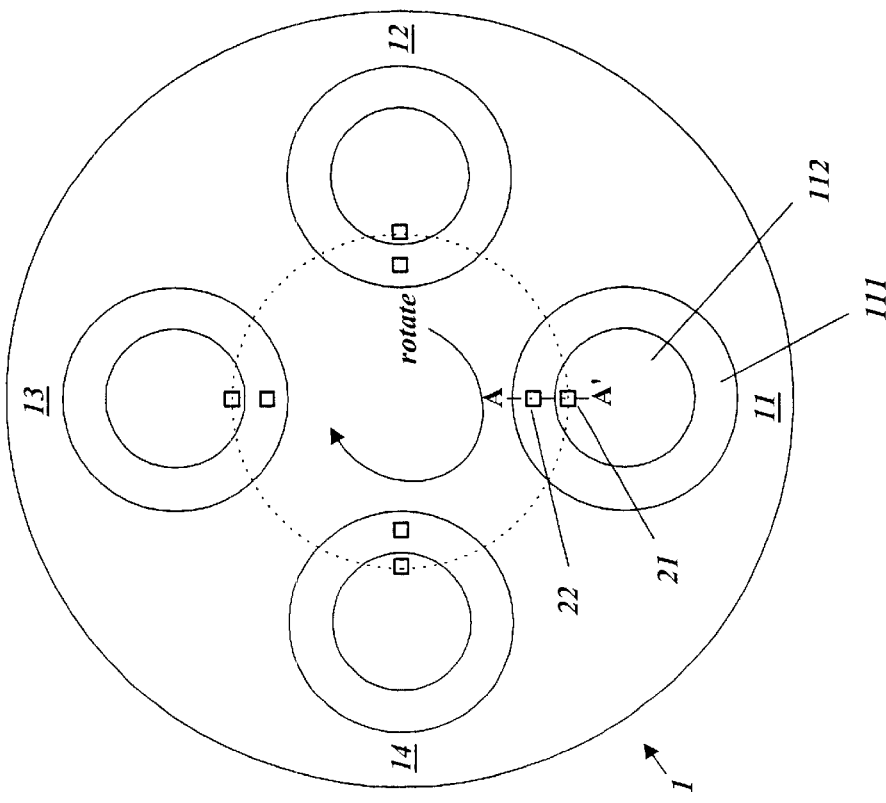
FIG. 1 is a simplified plan-view of a conventional multi-disk changer.
Figure 2B:
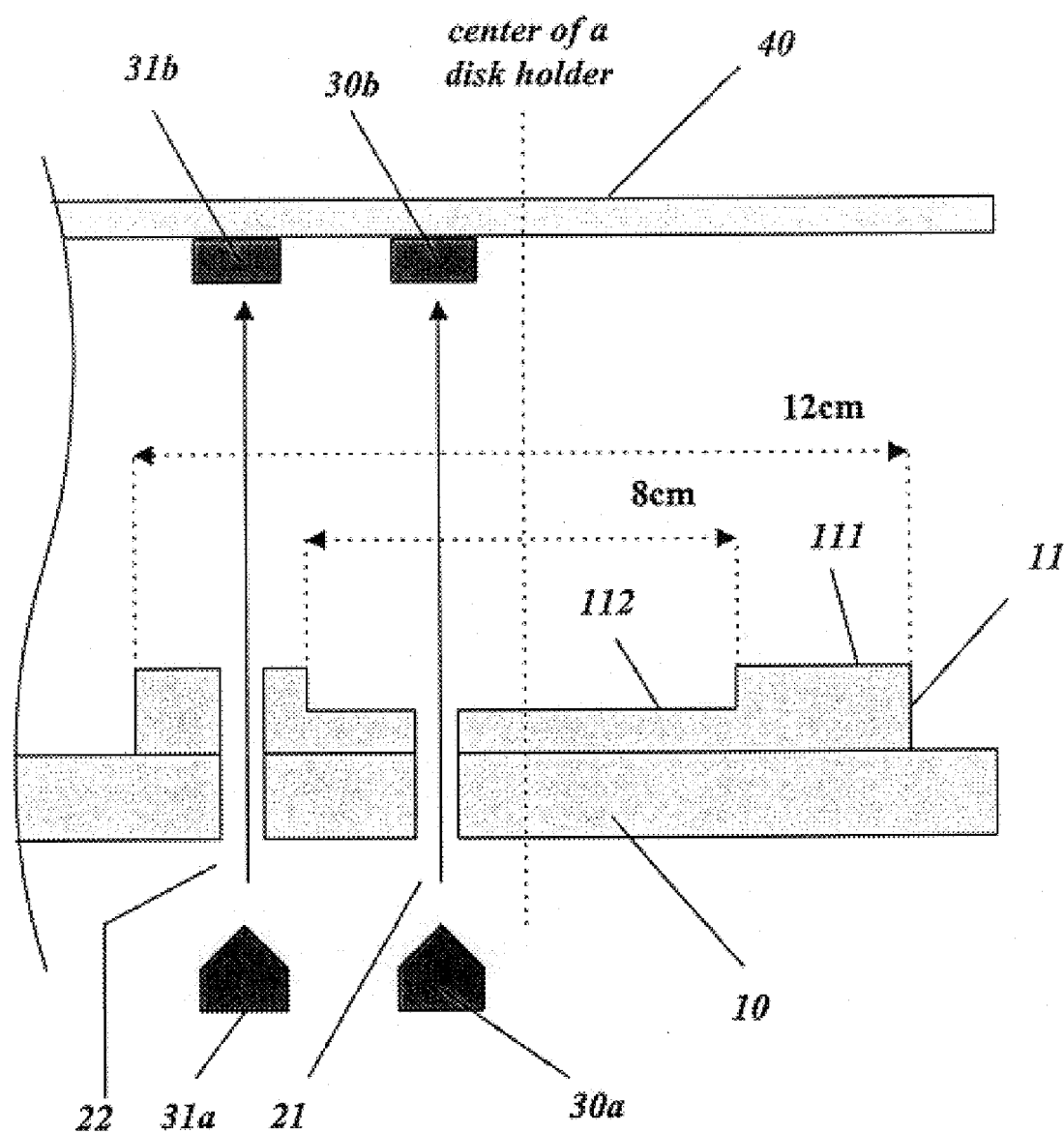
Figure 4A:
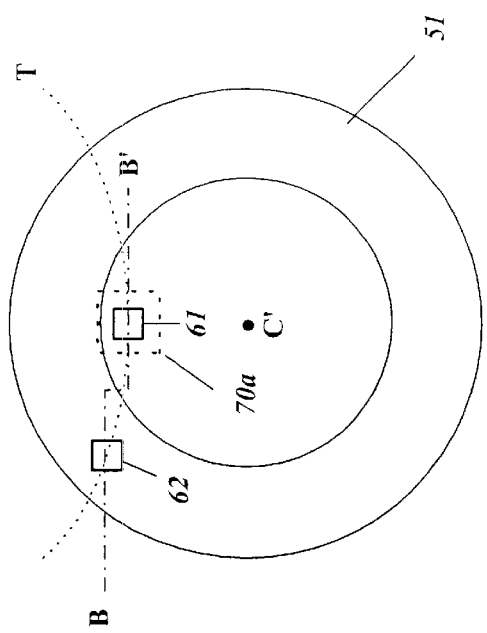
FIGS. 4A and 4B are drawings for explaining in detail the operation for determining size of a disk loaded into the multi-disk changer of FIG. 3.
Figure 3:
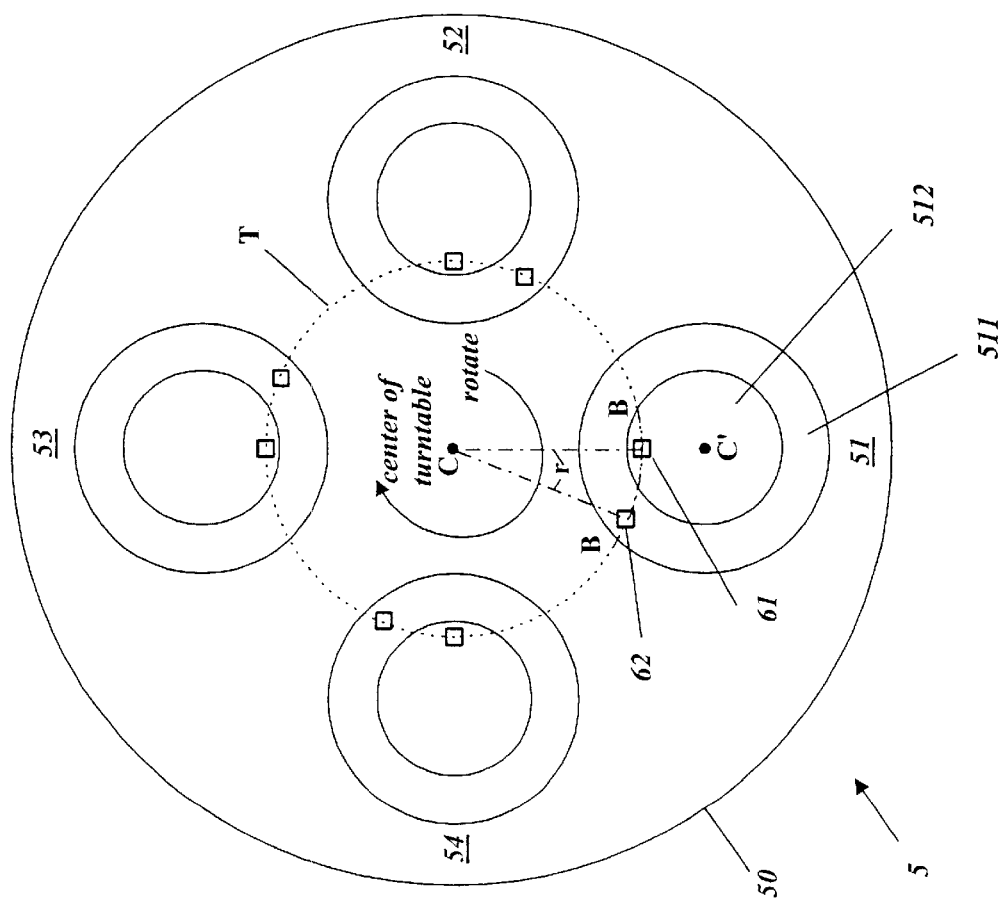
FIG. 3 is a simplified plan-view of a multi-disk changer according to the present invention.
Figure 4B:
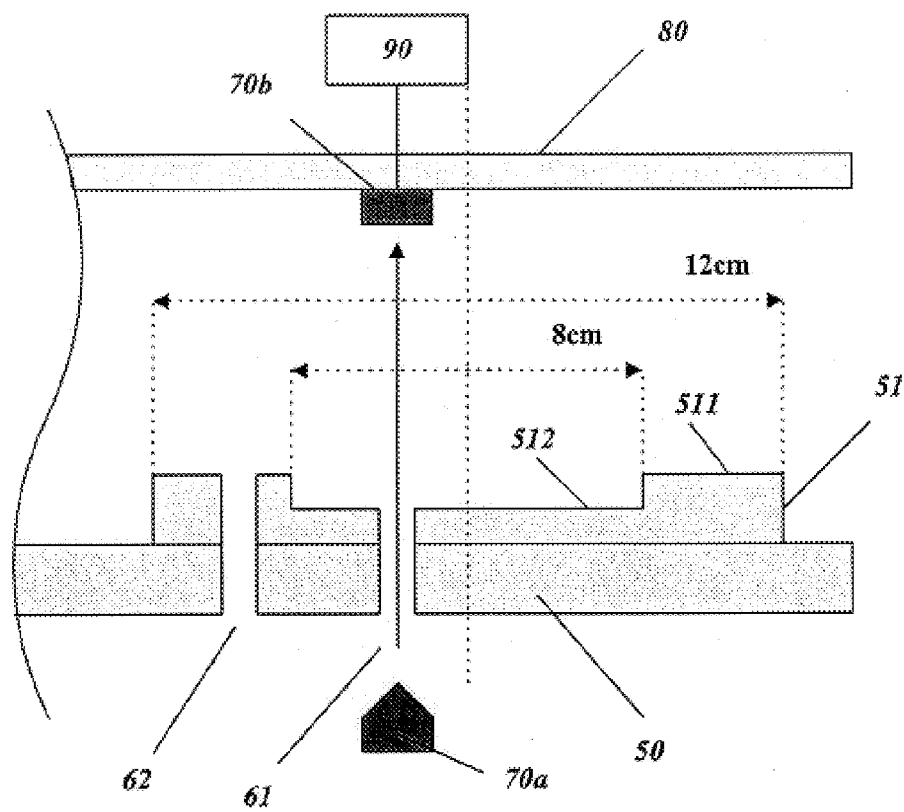

FIG. 3 is a simplified plan-view of a multi-disk changer according to the present invention, and FIGS. 4A and 4B are drawings for the purpose of describing in detail the operation for determining the size of a disk inserted in the multi-disk changer of FIG. 3.

The multi-disk changer 5 of FIG. 3 has a plurality of disk holders 51 to 54. A disk of different size, for example, 8-cm or 12-cm can be selectively placed onto each disk holder when it is reproduced or recorded. And, two through-holes 61 and 62 used for determining the disk size are formed in each disk holder along the same circular arc whose center coincides with that of a turntable 50.

As shown in FIG. 3 and FIG. 4A, the two through-holes 61 and 62 are disposed at the same distance r from the center C of the turntable 50 such that they are on the same arbitrary circular trajectory T, and one of the through-holes 61 and 62 is located on an inner radius range of a 8-cm disk from the center C' of a corresponding disk holder and the other is located between the 8-cm and 12-cm diameter range.

FIG. 4B is a cross-section taken along the line B–B' passing through the two holes 61 and 62 in FIG. 4A. As shown in FIG. 4B, a detecting sensor composed of a light-emitting element 70a and a photo-detecting element 70b is installed above and below the space where a disk holder to be reproduced or recorded is placed, and is disposed on a circular trajectory T which passes along each pair of holes 61 and 62. According to this structure and disposition, the detecting sensor 70 can produce pulse signal indicative of size of a disk placed on the disk holder 51, 52, 53, or 54. A determining means 90 for determining the disk size based on the pulse signal from the detecting sensor 70 may be a well-known microcomputer or an intelligent integrated chip.

The above configuration of both the through-holes 61 and 62 formed each disk holder 51, 52, 53, or 54 and the single detecting sensor 70 can produce a different signal in accordance with the absence of a disk and disk size. The different signal producing operation is described in detail hereinafter. For the purpose of a convenient explanation, it is assumed that a disk holder 51 among the plurality of disk holders 51 to 54 is to be positioned over an optical pickup when reproduction or the record is conducted.

Figure 5:
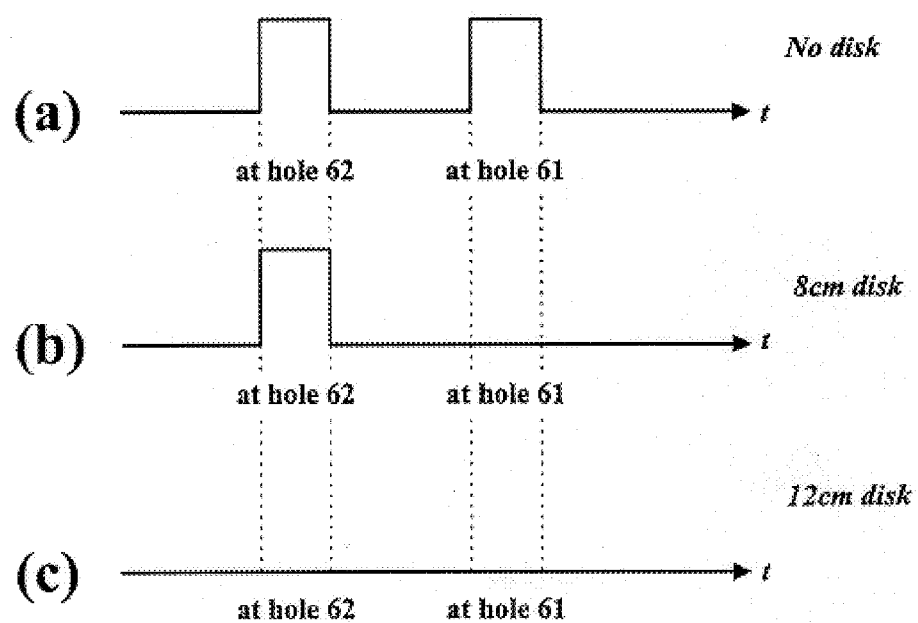
FIG. 5 shows several waveforms of a signal indicative of the absence of a disk and disk size in the embodiment of FIG. 3.

If the turntable 50 is rotating with no disk on the disk holder 51, a light-beam from the light-emitting element 70a sequentially passes through the two holes 61 and 62 formed along the circular trajectory T of the turntable 50. Therefore, signal transition, for example, 'Low' to 'High' transition occurs twice at a certain interval in an output signal of the photo-detecting element 70b of the detecting sensor 70 as shown in (a) of FIG. 5, so that the determining means 90 determines that there is no disk placed in the disk holder 51 if the output signal from the detecting sensor 70 makes two transitions or produces two 'High' levels. FIG. 5 shows the respective waveforms outputted from the detecting sensor 70 on the assumption that the turntable 50 rotates clockwise in the embodiment of FIG. 3.

If an 8-cm disk has been placed on an 8-cm holding space 512 of the disk holder 51, the inner hole 61 formed in the disk holder 51 is closed so that the light-beam from the light-emitting element 70a passes through only one hole 62 placed more outward while the turntable 50 is rotating, which causes signal transition from 'Low' to 'High' once as shown in (b) of FIG. 5. Therefore, the determining means 90 determines that an 8-cm disk has been placed on the disk holder 51 if the output signal from the detecting sensor 70 makes one transition or produces one 'High' level while the turntable 50 is rotating.

If a 12-cm disk has been placed on a 12-cm holding space 511 of the disk holder 51, both holes 61 and 62 are closed so that the photo-detecting element 70b of the detecting sensor 70 can not detect any light-beam, which results in no transition to 'High' in the output signal of the detecting sensor 70 as shown in (c) of FIG. 5. Therefore, the determining means 90 determines that a 12-cm disk has been placed on the disk holder 51 if there is no transition or no 'High' level while the turntable 50 is rotating.

In brief, the determining means receives signal from the photo-detecting element 70b of the detecting sensor while the turntable 50 rotates more than a certain angle, checks waveform of the received signal, and determines absence of a disk or disk size based on how many transitions the checked waveform has. When the disk size is determined, a servo control for a spindle motor is adjusted suitably for control optimization.

Figure 6A:
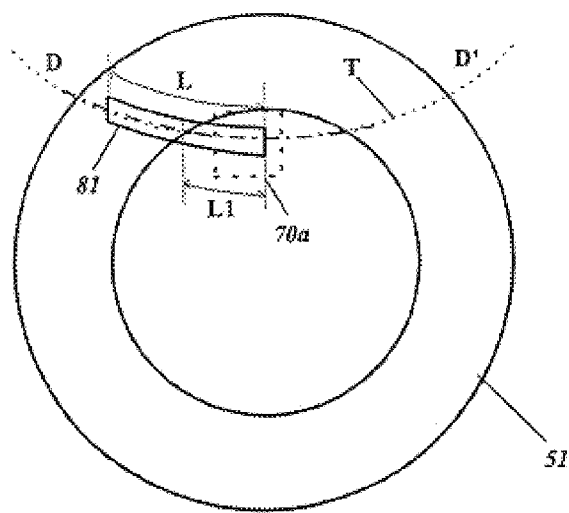
FIGS. 6A and 6B are drawings for explaining in detail another embodiment for determining size of a disk loaded into a multi-disk changer according to the present invention.
Figure 6B:
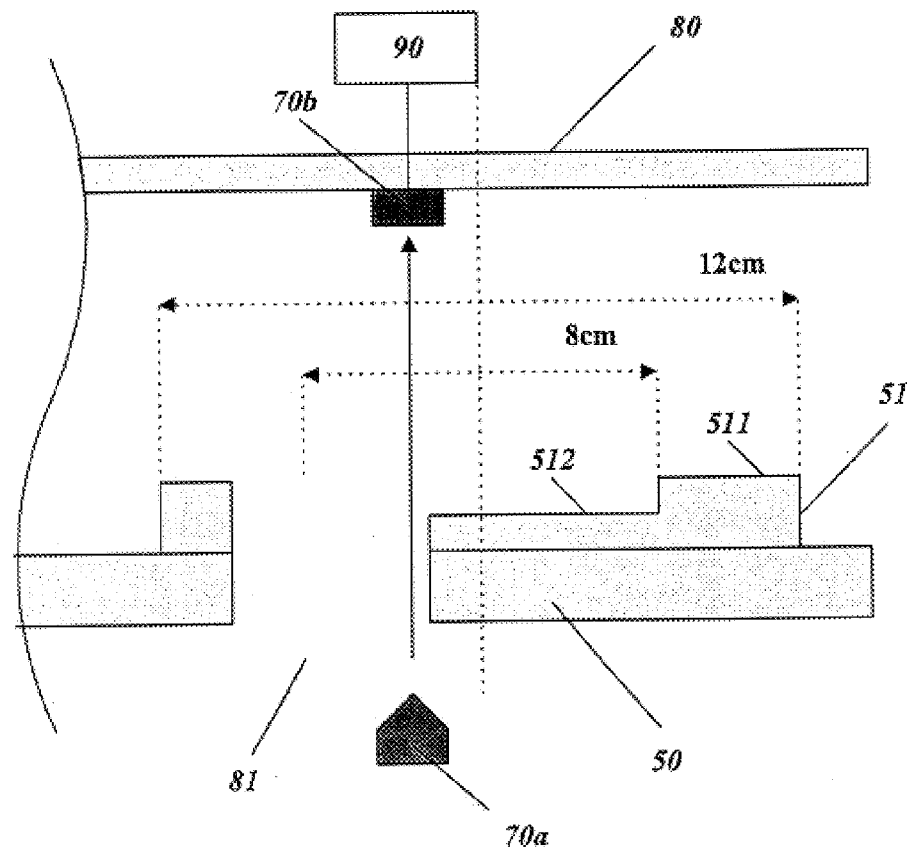

FIGS. 6A and 6B are drawings for the purpose of describing in detail another embodiment for determining the size of a disk loaded in a multi-disk changer according to the present invention.

In the embodiment of FIG. 6A, one arc-shaped hole 81 is formed along the circular trajectory T in each disk holder instead of the two holes 61 and 62. The detecting sensor is disposed above and below the reproducing or recording position of the turntable 50 as shown in FIG. 6B which shows a cross-sectional view taken along the arc line D–D' of FIG. 6A.

In the embodiment of FIG. 6A, the width of a pulse outputted from the photo-detecting element 70b is used to determine absence of a disk or disk size if a disk has been placed on a target disk holder. This determining operation is as follows.

Figure 7:
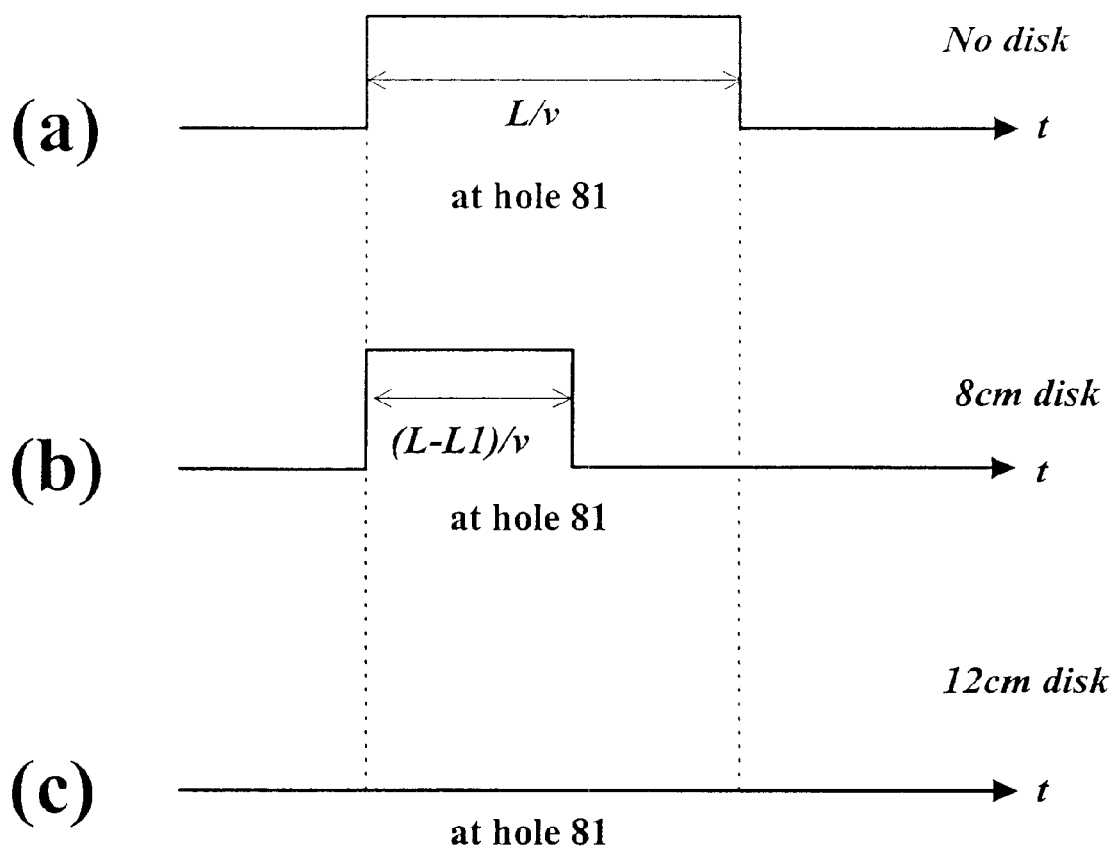
FIG. 7 shows several waveforms of a signal indicative of the absence of a disk and disk size in the embodiment of FIGS. 6A and 6B.

If there is no disk on the disk holder 51, which is assumed to be the target holder, the light-beam from the light-emitting element 70a passes through the arc-shaped hole 81 for a while so that the photo-detecting element 70b outputs a pulse whose 'High' level is sustained for that while. In this case, it is determined that there is no disk. The pulse width t in this case is L/v where L is the arc length of the arc-shaped hole 81 and v is linear velocity at the hole 81 when the turntable 50 rotates. The pulse generated in this case is shown in (a) of FIG. 7. The waveforms of FIG. 7 are drawn on the assumption that the turntable 50 rotates clockwise in the embodiment of FIG. 6A, similarly as with the aforementioned embodiment.

If a 8-cm disk is placed on the disk holder 51, the partial length L1 of the arc-shaped hole 81 is blocked, so that the light-beam from the light-emitting element 70a passes through the arc-shaped hole 81 during the time of (L−L1)/v when the turntable 50 rotates. As a result, the pulse from photo-detecting element 70b maintains its 'High' level for the time t=(L−L1)/v as shown (b) of FIG. 7. Because the pulse width becomes narrower, the determining means 90 determines that a 8-cm disk has been placed on the disk holder 51 if the pulse width is medium.

If a 12-cm disk is loaded onto the disk holder 51, the whole length of the arc-shaped hole 81 is closed, so that the light-beam from the light-emitting element 70a cannot reach the photo-detecting element 70b, so therefore the output signal does not make any transition, as shown in of FIG. 7(c). As a result, the determining means 90 determines that a 12-cm disk has been loaded if the output signal from the photo-detecting element 70b is not changed to 'High'.

In brief, the determining means checks pulse width of the output signal from the photo-detecting element 70b while the turntable 50 rotates, and determines the absence of a disk or disk size based on the absence of a pulse or a pulse width. When the disk size is determined, a servo control for a spindle motor is adjusted suitably for control optimization.

The apparatus and method of determining disk size in a multi-disk changer according to the present invention, can reduce manufacturing cost of a multi-disk changer owing to usage of a single detecting sensor.

The present invention may be embodied in other specific forms without departing from the sprit and/or scope of the invention. The present embodiments are therefore to be considered in all respects as illustrative and not restrictive, and thus all changes which come within the meaning and range of equivalency of the appended claims are therefore intended to be embraced within the scope of the present invention.

What is claimed is:

1. A method of determining the disk size in a multi-disk changer including a turntable, a plurality of disk holders installed at the same distance from the center of the turntable, each disk holder being able to selectively accommodate a disk of different size, and a single light-emitting element and a single photo-detecting element disposed above and/or below the turntable, comprising the steps of:

rotating the turntable;

detecting the characteristics of a signal generated by the interaction between the single light-emitting element and the single photo-detecting element when the turntable rotates; and determining the size of a disk placed on one of the disk holders based on the detected signal characteristics, wherein the signal produces a pulse whose width varies in accordance with the size of a disk placed on the disk holder.

2. The method as set forth in claim 1, wherein the size of the disk which can be loaded onto the disk holder is about 8-cm or 12-cm in diameter.

3. An apparatus for determining disk size in a multi-disk changer comprising:

a turntable;

a plurality of disk holders installed at a same distance from a center of the turntable, each disk holder being able to selectively accommodate different size disks, each of said disk holders having an arc-shaped hole formed therein, each arc-shaped hole having a radius of curvature with a center corresponding to the center of the turntable and each arc-shaped hole having a first end at a first radius relative to a center of its respective disk holder and a second end at a second radius, which is further from the center of its respective disk holder than the first radius; and a light-emitting element and a photo-detecting element disposed above and/or below the turntable, wherein each arc-shaped hole of said disk holders is capable of passing through a light-beam emanating from the light-emitting element in order that the disk size can be determined.

4. The apparatus set forth in claim 3, wherein the first end of each arc-shaped hole is located less than 8 cm from the center of its respective disk holder.

5. The apparatus set forth in claim 3, wherein the second end of each arc-shaped hole is located greater than 8 cm from the center of its respective disk holder.

6. The apparatus set forth in claim 3, wherein a disk placed upon a disk holder partially covers the arc-shaped hole of the disk holder, when the disk has a diameter of 8 cm.

* * * * *